(12) United States Patent
Omori

(10) Patent No.: US 6,854,652 B2
(45) Date of Patent: Feb. 15, 2005

(54) BARCODE DISPLAYING METHOD AND BARCODE DISPLAYING PROGRAM PRODUCT

(75) Inventor: Youichi Omori, Fuji (JP)

(73) Assignee: Toshiba Tec Kabushiki Kaisha (JP)

(*) Notice: Subject to any disclaimer, the term of this patent is extended or adjusted under 35 U.S.C. 154(b) by 0 days.

(21) Appl. No.: 10/401,281

(22) Filed: Mar. 27, 2003

(65) Prior Publication Data

US 2004/0020988 A1 Feb. 5, 2004

(30) Foreign Application Priority Data

Mar. 28, 2002 (JP) .................................. 2002-093012

(51) Int. Cl.$^7$ .................................................. G06K 7/10
(52) U.S. Cl. .................................. 235/462.01; 235/376
(58) Field of Search ..................... 235/462.01, 375, 235/376; 705/14

(56) References Cited

U.S. PATENT DOCUMENTS

| | | | | |
|---|---|---|---|---|
| 5,399,844 A | * | 3/1995 | Holland | 235/376 |
| 5,781,175 A | * | 7/1998 | Hara | 345/670 |
| 6,131,811 A | * | 10/2000 | Gangi | 235/380 |
| 6,493,110 B1 | * | 12/2002 | Roberts | 358/1.2 |
| 2002/0042743 A1 | * | 4/2002 | Ortiz et al. | 705/14 |

* cited by examiner

Primary Examiner—Michael G. Lee
Assistant Examiner—Seung H Lee
(74) Attorney, Agent, or Firm—Harness, Dickey & Pierce, P.L.C.

(57) ABSTRACT

In a method of displaying a barcode on a terminal unit having a memory and a display unit, a plurality of pieces of barcode information are received from an external device and stored in the memory. Barcode display information is generated from each of the plurality of pieces of barcode information stored in the memory. In the method, the plurality of pieces of generated barcode display information are sequentially supplied to the display unit, and a plurality of barcodes are displayed in a window, each replacing the displayed barcode before.

2 Claims, 4 Drawing Sheets

BARCODE DISPLAYING METHOD AND BARCODE DISPLAYING PROGRAM PRODUCT

CROSS-REFERENCE TO RELATED APPLICATIONS

This application is based upon and claims the benefit of priority from the prior Japanese Patent Application No. 2002-93012, filed on Mar. 28, 2002, the entire contents of which are incorporated herein by reference.

BACKGROUND OF THE INVENTION

The present invention relates to a method and program which display a barcode on a portable terminal unit, e.g., a portable information terminal or cellular phone, having a memory and display unit.

Japan Patent Application KOKAI Publication No. 2002-32723 describes a portable terminal unit having a barcode display means and a communication means. In the portable terminal unit, barcode data containing the ID number and service information of a customer, which is received through the communication means, is converted into barcode display data and displayed on the barcode display means. When the displayed barcode is read by a barcode scanner of a POS (Point-Of-Sales) terminal, a member card service or coupon ticket service is provided to the user.

However, the terminal unit described in the publication stationarily displays a barcode on the barcode display means and cannot receive and transfer a number of pieces of information. In addition, since the display means of the portable terminal unit is small, it is impossible to display a plurality of barcodes on the display means and sequentially read them by a barcode scanner to provide various kinds of coupon ticket services to a user.

Hence, there is a need for a barcode displaying method and barcode displaying program, which can receive and transfer a number of pieces of information in a terminal unit having a memory and display unit.

BRIEF SUMMARY OF THE INVENTION

According to an embodiment of the present invention, a method of displaying a barcode on a terminal unit having a memory and a display unit comprises causing the terminal unit to receive a plurality of pieces of barcode information from an external device and store the plurality of pieces of barcode information in the memory, generating barcode display information from each of the plurality of pieces of barcode information stored in the memory, sequentially supplying the plurality of pieces of generated barcode display information to the display unit, and displaying a plurality of barcodes in a window, each replacing the barcode displayed before.

Objects and advantages of the invention will become apparent from the description which follows, or may be learned by practice of the invention.

BRIEF DESCRIPTION OF THE DRAWINGS

The accompanying drawings illustrate embodiments of the invention, and together with the general description given above and the detailed description given below, serve to explain the principles of the invention.

DETAILED DESCRIPTION OF THE INVENTION

Embodiments of the present invention will be described below with reference to the accompanying drawings.

Figure 1:
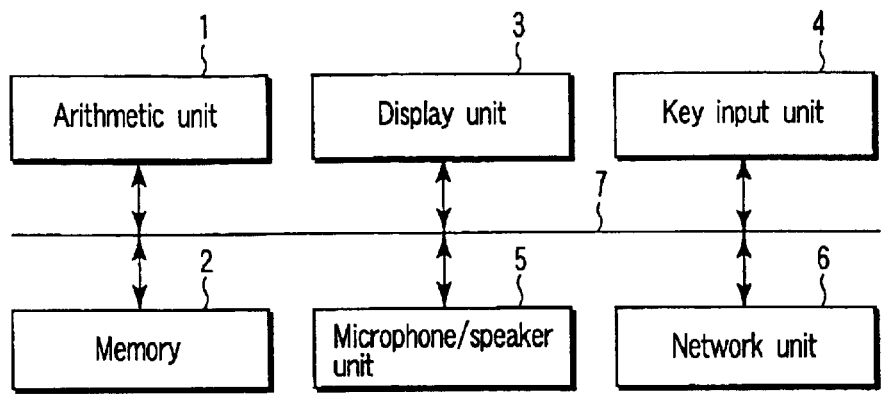
FIG. 1 is a block diagram showing a configuration of a main part of a cellular phone according to an embodiment of the present invention.

FIG. 1 is a block diagram showing a configuration of a main part of a cellular phone serving as a terminal unit. The cellular phone has an arithmetic unit 1, memory 2, display unit 3, key input unit 4, microphone/speaker unit 5, and network unit 6. These are electrically connected through a bus line 7.

The arithmetic unit 1 includes a CPU, ROM, and RAM. The arithmetic unit 1 executes a program to perform arithmetic processing. The memory 2 comprises a RAM and stores information. The display unit 3 has a liquid crystal display screen and displays various characters and images. The key input unit 4 is used to input a telephone number or character. The microphone/speaker unit 5 inputs/outputs audio data. The network unit 6 (communication unit) transmits/receives data through a network.

Figure 2:
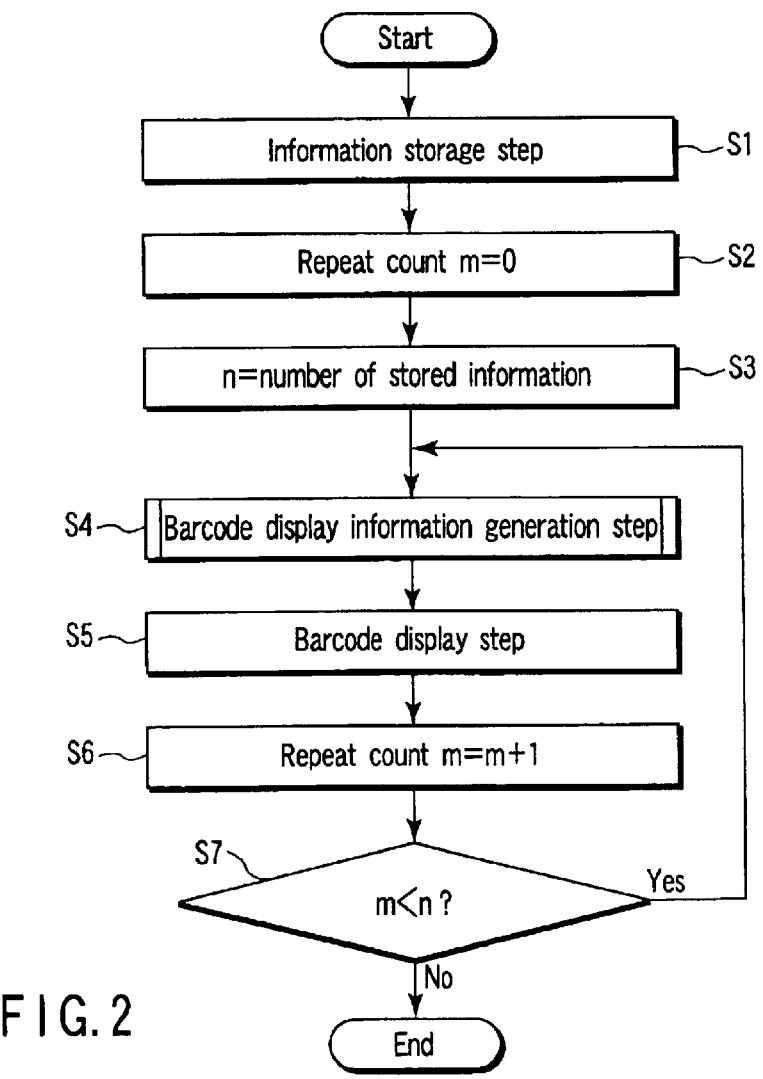
FIG. 2 is a flow chart showing barcode display control of the cellular phone according to the embodiment.

The cellular phone downloads a program for barcode display control from an external device and executes barcode display control shown in FIG. 2.

In step Si, information storage processing is performed to store, in the memory 2, a plurality of pieces of information to be used to display barcodes. In step S2, 0 is substituted into a repeat count $\underline{m}$ of a repeat counter arranged in the memory 2. In step S3, the number of barcode data stored in the memory 2 is substituted into a variable $\underline{n}$.

In step S4, barcode information generation processing is performed to generate information for displaying barcodes. In step S5, barcode display processing for displaying barcodes on the display unit 3 is executed. In step S6, the repeat count $\underline{m}$ of the repeat counter is incremented by one. In step S7, the repeat count $\underline{m}$ is compared with the variable $\underline{n}$.

If m<n, returning to step S4, and then processing in steps S4 to S6 is repeated. When m=n, the series of processing operations are ended.

The barcode information generation processing in step S4 and barcode display processing in step S5 of the series of processing operations will be explained in more detail with reference to FIGS. 3 and 4, respectively. In this example, a barcode produced under a standard called JAN is used for explanation.

Figure 3:
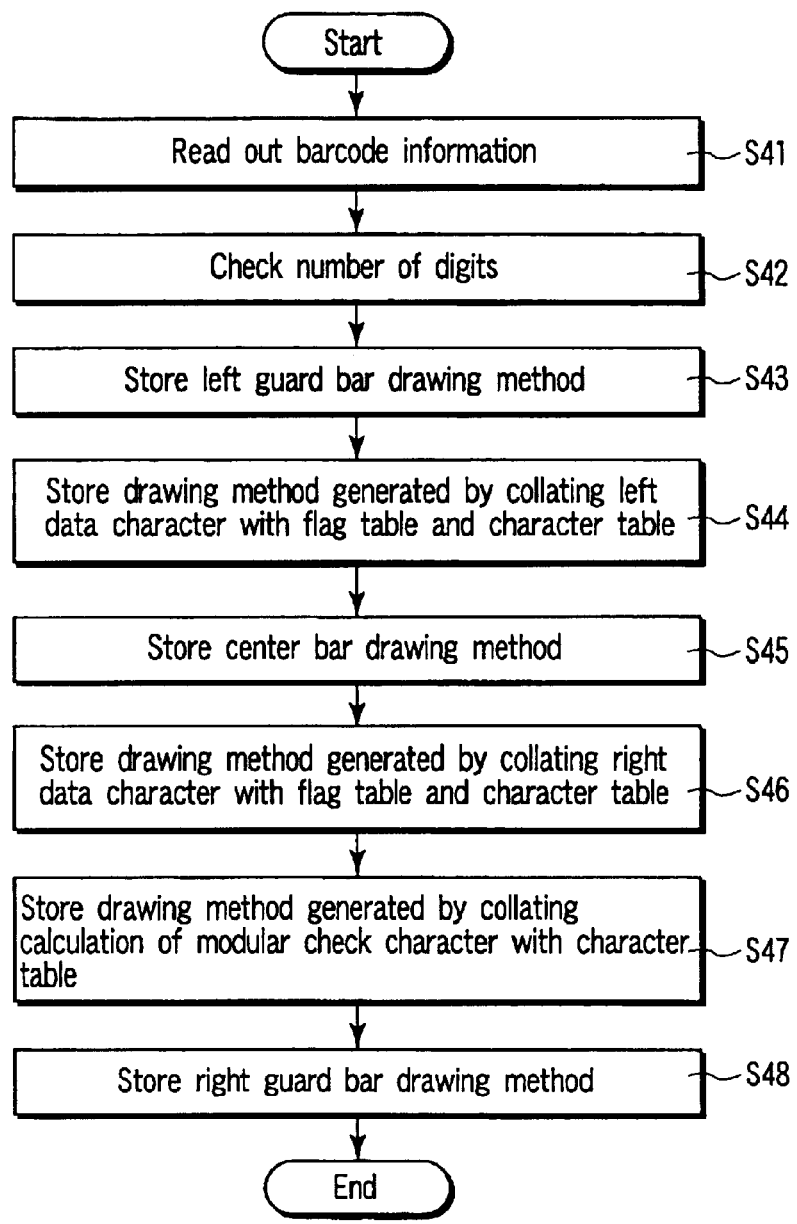
FIG. 3 is a flow chart showing barcode information generation processing in the barcode display control shown in FIG. 2.

FIG. 3 shows the barcode information generation processing in step S4. In this processing, first, in step S41, pieces of barcode information stored in the memory 2 are read out. Since a plurality of pieces of barcode information are stored, they are read out in, e.g., ascending order of memory addresses at which the pieces of information are stored, thereby preventing the same information from being read out many times.

In step S42, the number of digits of the readout barcode information is checked so that left data and right data can be separated. In step S43, a left guard bar drawing method is stored in the memory 2. In step S44, a drawing method generated by collating the left data character with the flag table and character table is stored in the memory 2.

When processing for the left data is ended, a center bar drawing method is stored in the memory 2 in step S45. In step S46, a drawing method generated by collating the right data character with the flag table and character table is stored in the memory 2.

In step S47, the modular check character is calculated, and a drawing method generated by collating the value of the calculation result with the character table is stored in the memory 2. Finally, in step S48, a right guard bar drawing method is stored in the memory 2.

In this example, the modular check character is calculated. This calculation can be omitted when data obtained by calculating the modular check character is stored in advance. In this example, the barcode display information is generated by storing the drawing methods. Instead, the barcode display information may be generated by converting the barcode information into barcode image data.

Figure 4:
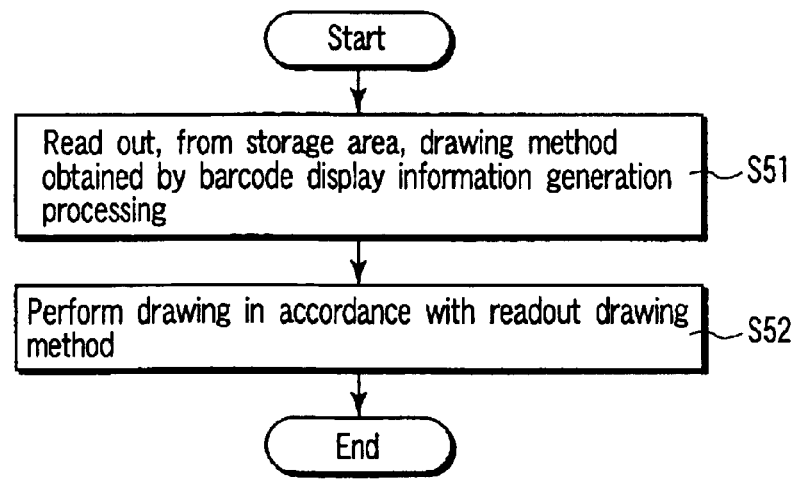
FIG. 4 is a flow chart showing barcode display processing in the barcode display control shown in FIG. 2.

FIG. 4 shows the barcode display processing in step S5. In step S51, the drawing method generated in the above-described barcode display information generation processing in step S4 is read out from the storage area of the memory 2. In step S52, a barcode is drawn on the display unit 3 in accordance with the readout drawing method.

In this arrangement, the cellular phone downloads the program for barcode display control from an external device, then receives a plurality of pieces of information to be used to display barcodes on the basis of the program, and stores the information in the memory 2. The pieces of barcode display information are sequentially read out from the memory 2. The left guard bar, center bar, and right guard bar drawing methods are stored in the memory 2. The stored bar drawing methods are read out to draw a barcode on the display unit 3 so that the barcode is displayed. This processing is automatically repeated a number of times in correspondence with the number of barcode display information stored in the memory 2. Then, the barcode display is ended. That is, barcode display is automatically executed for all pieces of barcode display information stored in the memory 2, and the processing is ended.

Barcode display on the display unit 3 is not limited to this. For example, display may be repeatedly executed until a specific key of the key input unit 4 is operated. Alternatively, replacing the displayed barcode may be executed not automatically but by user key input. Replacing the displayed barcode may be done either by overwriting new display data or by temporarily turning off the display and then displaying new data.

An example of a system which provides a coupon information service using the above-described cellular phone that displays a barcode on the display unit 3 will be described next.

Figure 5:
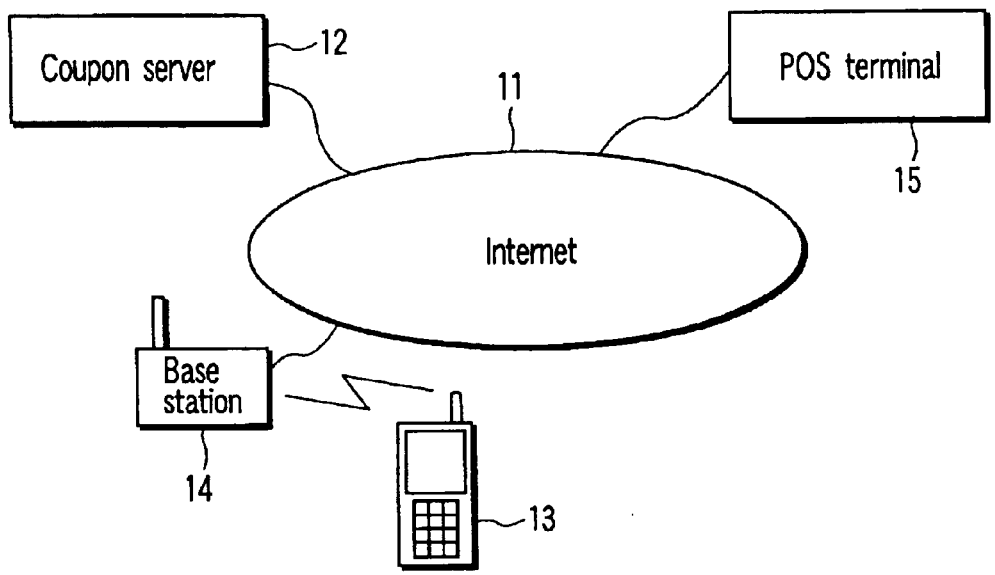
FIG. 5 is a view showing a configuration of the entire barcode system using the cellular phone according to the embodiment.

As shown in FIG. 5, a coupon server 12 which provides coupon information, a base station 14 which allows radio communication with a cellular phone 13, and a POS (Point-Of-Sales) terminal 15 which registers articles purchased by customers and executes settlement for customers are connected to Internet 11. The cellular phone 13 has the same configuration as that shown in FIG. 1.

The cellular phone 13 requests, through the base station 14 and Internet 11, the coupon server 12 to download a coupon program that should be used to receive a coupon from the server 12 and execute barcode display control. The coupon program is downloaded from the coupon server 12. When the cellular phone 13 downloads the coupon program, barcode display control based on coupon information provided from the coupon server 12 can be performed.

Figure 6:
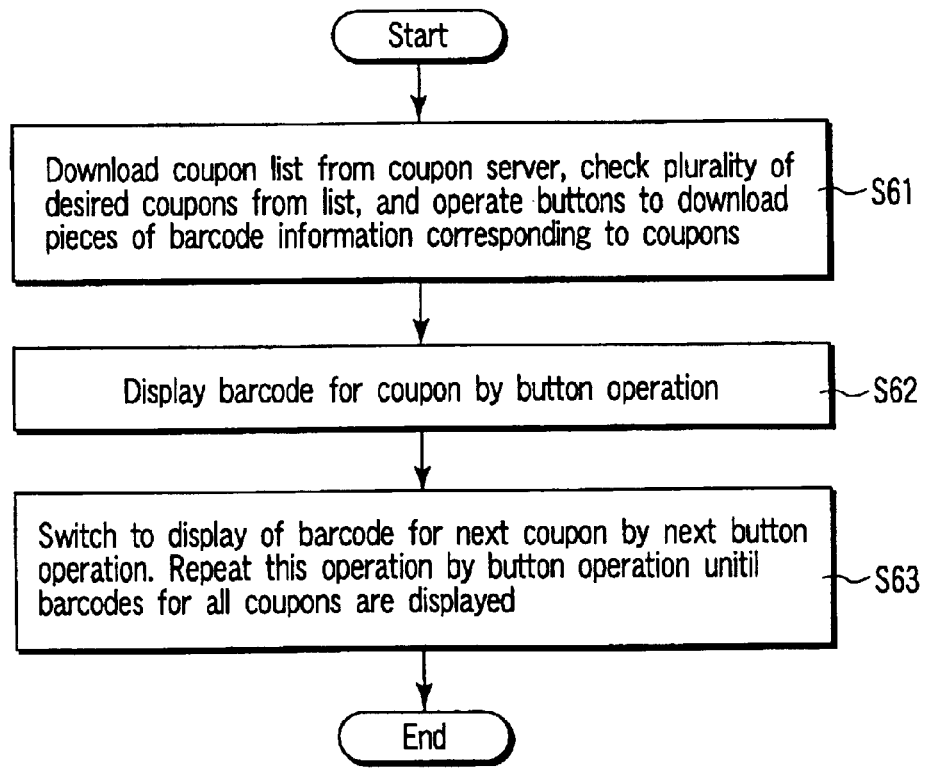
FIG. 6 is a flow chart showing barcode display control of the cellular phone in the system using the cellular phone according to the embodiment.

The cellular phone 13 that has downloaded the coupon program executes coupon providing processing, as shown in FIG. 6. In this example, the barcode display window on the cellular phone 13 is switched when the user operates key buttons of the key input unit 4.

First, in step S61, the cellular phone 13 requests the coupon server 12 to download a coupon list. The coupon list is downloaded from the coupon server 12 to the cellular phone 13. The user checks, i.e., selects a plurality of desired coupons from the coupon list and downloads a plurality of pieces of barcode information corresponding to the plurality of selected coupons from the coupon server 12 to the cellular phone 13 by operating key buttons of the key input unit 4. The cellular phone 13 stores the plurality of pieces of downloaded barcode information in the memory 2.

In step S62, when the user operates key buttons of the key input unit 4, barcode generation processing for the first coupon is performed, and the generated barcode is displayed on the display unit 3.

In step S63, when the user operates the key buttons of the key input unit 4 again, barcode generation processing for the second coupon is performed, and the generated barcode is displayed on the display unit 3. When the user repeatedly operates the key buttons, barcode generation processing for the remaining coupons is performed, and the generated barcodes are sequentially displayed on the display unit 3.

Figure 7A:
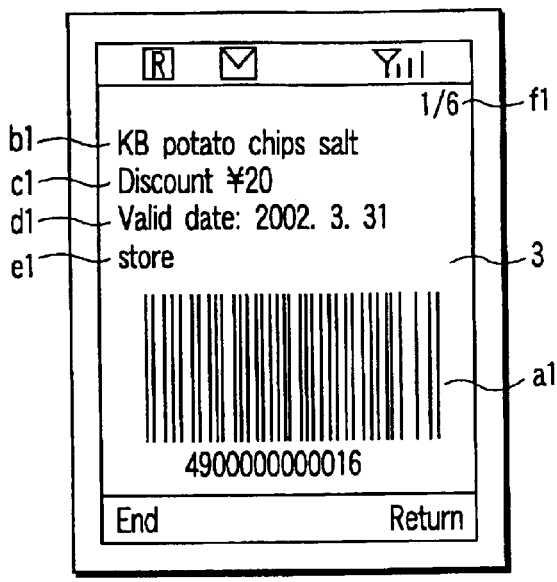
FIGS. 7A, 7B, and 7C are views showing examples of barcode display of the cellular phone in the system using the cellular phone according to the embodiment.

For example, assume a total of six coupons are selected from the coupon list. By the first key button operation, a barcode a1 of the corresponding coupon is displayed on the display unit 3, as shown in FIG. 7A. At this time, an article name b1, discount amount c1, validity d1, and shop name e1 are simultaneously displayed. As an example of the scheme of displaying the total number of barcodes, to notify the user that the total number of coupons to be displayed is six, and the first coupon is to be displayed, numerical information f1 "⅙" is displayed.

Figure 7B:
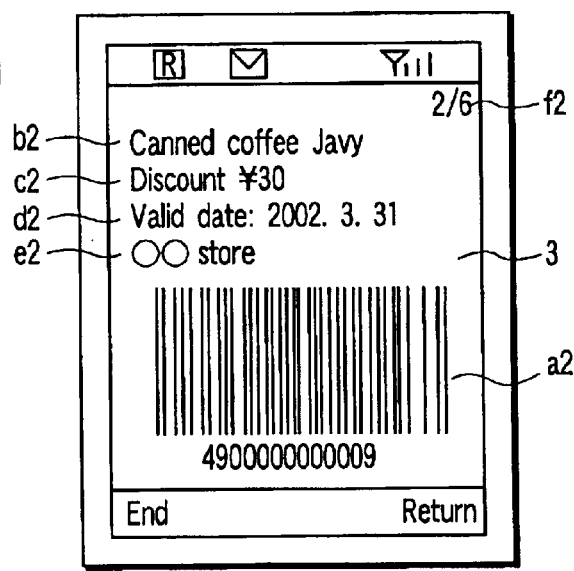

By the next key button operation, a barcode a2 of the corresponding coupon is displayed on the display unit 3, as shown in FIG. 7B. At this time, an article name b2, discount amount c2, validity d2, and shop name e2 are simultaneously displayed. In addition, numerical information f2 is also displayed to notify the user that the currently displayed coupon is the second coupon of the total of six coupons.

Figure 7C:
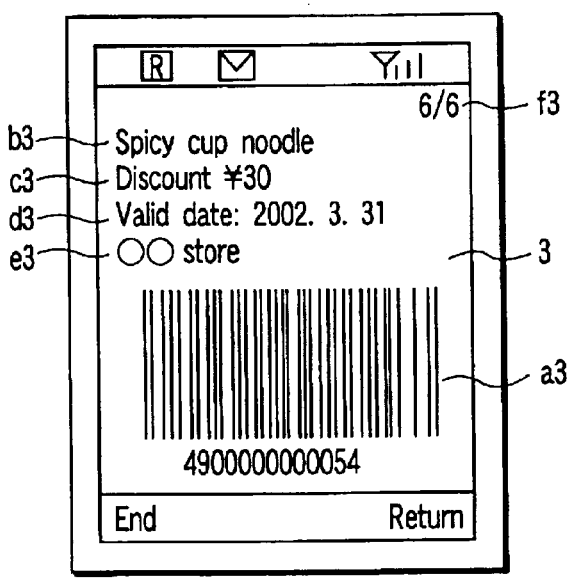

By the sixth key button operation, a barcode a3 of the corresponding coupon is displayed on the display unit 3, as shown in FIG. 7C. At this time, an article name b3, discount amount c3, validity d3, and shop name e3 are simultaneously displayed. In addition, numerical information f3 is also displayed to notify the user that the currently displayed coupon is the sixth coupon of the total of six coupons.

The POS terminal 15 has a barcode scanner. The barcode displayed on the display unit 3 of the cellular phone 13 is read with the barcode scanner and the POS terminal 15 executes discount processing for the corresponding article.

In this arrangement, the user requests, from the cellular phone 13 to the coupon server 12, to download the coupon program that should be used to receive a coupon information from the server 12 and execute barcode display control. The coupon program is downloaded from the coupon server 12. From this time, the cellular phone 13 can execute the barcode display control according to coupon information provided from the coupon server 12 on the basis of the downloaded coupon program.

When the user is to purchase an article at a shop, and the POS terminal 15 executes registration processing to this article, the user operates the cellular phone 13, that has downloaded the coupon program, to download a coupon list from the coupon server 12. The user selects from the coupon list a coupon necessary for discount for the purchased article. When a plurality of articles are to be discounted, the user selects a plurality of coupons.

Information for the plurality of selected coupons is transmitted to the coupon server-12. A plurality of pieces of corresponding barcode information are downloaded from the coupon server 12 to the cellular phone 13. The barcode for the first coupon is displayed on the display unit 3 by key operation. In this state, the user presents the display unit 3 to an operator of the POS terminal 15. The operator operates the barcode scanner to read the barcode displayed on the display unit 3 of the cellular phone 13. With this operation, the POS terminal 15 can obtain the discount information of the specific article from the read barcode information. Then, the discount processing for the already registered specific article is performed.

Next, the user operates the key buttons again to replace the barcode displayed on the display unit 3 and presents the display unit 3 to the operator of the POS terminal 15 again. The operator operates the barcode scanner to read the barcode displayed on the display unit 3 of the cellular phone 13. With this operation, the POS terminal 15 can obtain the discount information of the specific article from the read barcode information and executes the discount processing for the already registered specific article.

This operation is repeatedly performed. This repeated operation enables the user to obtain discounts for articles to be purchased using all the downloaded coupons.

According to the above processing, even when only one barcode can be displayed because of the small display region of the display unit 3 of the cellular phone 13, a plurality of barcodes can be displayed, each replacing the barcode displayed before.

In the form described above, the coupons are downloaded at the time of payment. However, when coupons are downloaded to the cellular phone 13 in advance before the user comes to the shop, desired coupons are selected at the time of payment from the already downloaded coupons, and the selected coupons are presented to the operator of the POS terminal 15, the payment efficiency and the ability of attracting consumers to the shop from the outside can be increased.

In the above example, the displayed barcode is replaced by operating the key buttons of the key input unit 4. However, the present invention is not limited to this.

For example, the displayed barcode may be automatically replaced, as in the barcode display shown in FIG. 2. In this case, the barcode scanner is kept on the display unit 3 of the cellular phone 13. To reliably read the barcodes, the cellular phone 13 preferably replaces the barcode displayed at a sufficiently long time interval using a timer.

As another automatic replacing method, a beep may be generated when the POS terminal 15 has read a barcode without any problem, and the cellular phone may detect the beep and automatically replace the displayed barcode.

The operator may be notified of the end of barcode read in the following way. After the last barcode is displayed on the cellular phone, a barcode that indicates for the POS terminal 15 the end of coupons may be displayed. Upon receiving the barcode, the POS terminal 15 may turn on a specific lamp or buzz to notify the operator of the end. Alternatively, after the last barcode is displayed, a message that indicates the end of coupons may be displayed on the display screen of the cellular phone. The operator who notices the absence of beep for the barcode read may look at the display screen and confirm the end of the read.

In the above embodiment, to display the total number of barcodes, numerical information that indicates the total number of coupons to be displayed and the ordinal number of the currently displayed coupon is displayed. However, the present invention is not limited to this.

In the above embodiment, a 1-level barcode has been exemplified. However, the embodiment can also be applied to a multilevel barcode capable of expressing a number of pieces of information. For example, for a 2-level barcode, two barcodes, i.e., upper and lower barcodes make a set. Hence, every 2-level barcode may be replaced at the display unit of the cellular phone. This also applies to a 3-level barcode including upper, middle, and lower barcodes. How many levels of barcodes can be displayed depends on the size of the display area of the display unit.

In the above embodiment, a barcode of coupon information has been exemplified as a barcode to be displayed. However, the present invention is not limited to this.

For example, a member ID may be displayed before or after displaying coupon information. When the member ID is read, authentication of the member and discount by coupons can efficiently be executed.

In the above embodiment, a cellular phone is used as a terminal unit. However, the present invention is not limited to this. A portable information terminal such as a PDA may be used.

As has been described above in detail, according to an embodiment of the present invention, a number of pieces of information can be transferred by a barcode displaying method and barcode displaying program, which sequentially supply a plurality of pieces of barcode display information to the display unit of a terminal unit having a memory and the display unit, and display a plurality of barcodes in a window, each replacing the barcode displayed before.

The present invention can be embodied as systems, methods, or computer program products. As will be appreciated by those of skill in the art, the present invention can take the form of an entirely hardware embodiment, an entirely software embodiment, or an embodiment containing both software and hardware aspects. Furthermore, the present invention can take the form of a computer program product on a computer-usable or computer-readable storage medium having computer-usable or computer-readable program code means embodied in the medium for use by or in connection with an instruction execution system.

The computer-usable or computer-readable medium can be, for example, an electronic, magnetic, optical, electro-magnetic or semiconductor system, apparatus, or propagation medium. Specific examples of the computer-readable medium may include a portable computer diskette, a random access memory (RAM), and an erasable programmable read-only memory (EPROM or Flash Memory).

Additional advantages and modifications will readily occur to those skilled in the art. Therefore, the invention in its broader aspects is not limited to the specific details and representative embodiments shown and described herein. Accordingly, various modifications may be made without departing from the spirit or scope of the invention as defined by the appended claims and their equivalents thereof.

What is claimed is:

1. A method of displaying a barcode on a terminal unit having a memory and a display unit, comprising:
   causing the terminal unit to receive a plurality of pieces of barcode information from an external device and store the plurality of pieces of barcode information in the memory;
   generating barcode display information from each of the plurality of pieces of barcode information stored in the memory;
   sequentially supplying the plurality of pieces of generated barcode display information to the display unit and displaying a plurality of barcodes in a window, each replacing the displayed barcode before; and
   displaying a barcode that indicates an end of barcode display, after all the plurality of barcodes are sequentially displayed on the display unit.

2. A method of displaying a barcode on a terminal unit having a memory and a display unit, comprising:
   a first step of causing the terminal unit to receive a plurality of pieces of barcode information from an external device and store the received barcode information in the memory;
   a second step of inputting 0 into a repeat count m;
   a third step of inputting the number of the received barcode information into a variable n;
   a fourth step of generating barcode display information from each of the received barcode information stored;
   a fifth step of displaying one of the generated barcode display information in the display unit;
   a sixth step of incrementing the repeat count m by one;
   a seventh step of comparing the repeat count m with the variable n; and
   an eighth step of repeating the fourth step, fifth step and sixth step if m<n and finishing a series of processing operations if m=n.

* * * * *